(12) United States Patent  
Habedank

(10) Patent No.: US 6,729,689 B2
(45) Date of Patent: May 4, 2004

(54) REAR SEAT FOR VEHICLES

(75) Inventor: Klaus-Dieter Habedank, Stadthagen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 10/215,508

(22) Filed: Aug. 12, 2002

(65) Prior Publication Data

US 2003/0030312 A1 Feb. 13, 2003

(30) Foreign Application Priority Data

Aug. 10, 2001 (DE) .......................... 101 39 538

(51) Int. Cl.7 ............... A47C 4/00; A47C 1/02
(52) U.S. Cl. ................ 297/335; 297/16.1; 297/21; 297/24; 297/331
(58) Field of Search ............. 297/16.1, 20, 21, 297/24, 42, 46, 51, 59, 344.12, 331, 335; 248/421, 424

(56) References Cited

U.S. PATENT DOCUMENTS 5,626,391 A * 5/1997 Miller et al. ............. 297/331
5,765,894 A * 6/1998 Okazaki et al. .......... 296/65.03
6,000,742 A   12/1999 Schaeffer et al. ........ 296/65.09
6,361,098 B1 * 3/2002 Pesta et al. .............. 296/65.03
6,523,899 B1 * 2/2003 Tame ...................... 297/331
2002/0125753 A1 * 9/2002 Kammerer ................ 297/331

FOREIGN PATENT DOCUMENTS

GB      2355180       4/2001  ................. 2/36

* cited by examiner

Primary Examiner—Milton Nelson, Jr.
Assistant Examiner—Sarah C. Burnham
(74) Attorney, Agent, or Firm—Bourque & Associates, P.A.

(57) ABSTRACT

A locking and pivoting mechanism for a rear seat includes a first, approximately horizontal use position; a second, approximately vertical position; and a third lowered position. The seat includes a front and a rear link. A lower end of the front link is attached to the chassis and an upper end is attached to the seat body so that it may be displaced longitudinally, and may be affixed to the seat body by means of a first locking pawl. An upper end of the rear link is attached to the seat body and a lower end is releasably connected to the chassis by means of a second locking pawl. At least one of locking pawl locks the seat in and releases the seat from the first, second, and third positions.

16 Claims, 7 Drawing Sheets

REAR SEAT FOR VEHICLES

FIELD OF THE INVENTION

The invention relates to a rear seat for a vehicle such as an automobile and more particularly, to. a rear seat pivoting and locking mechanism.

BACKGROUND OF THE INVENTION

A rear seat of the known type (U.S. Pat. No. 6,000,742) typically serves in vehicle seats, such as automobiles, with at least three rows of seats, particularly in vans, first to simplify access to the third seat row, and second, to allow a largely flat enlargement of the cargo space. The seat body is therefore capable of being folded forward and locked in a vertical storage position or capable of being lowered while the seat back is folded forward. Folding the seat back forward, or lowering or swinging the seat body forward, is controlled by two parallel-mounted connecting levers from which one of the forward linkages connects with a locking device to the seat back, and a second one connects a swivel fixed pivot bracket for the front linkage with the rear linkage. The seat body is not secured against unintentional folding back or raising either in the storage or in the lowered position.

Based on this state of the art, it is the task of the present invention to prevent unintentional movement of a rear seat of the known type when in the storage and/or lowered position.

Further, no specialized actuation means should be required to lock the seat body in the storage position or in the lowered position. Locking and release of the seat body while in these final positions is largely performed using the same actuation elements. The locking elements need only be slightly modified for their extra task, so that only small expense and room are required for the solution.

SUMMARY OF THE INVENTION

The present invention features a locking and pivoting mechanism for a vehicle rear seat having a seat back mounted on a seat body and capable of being folded forward. The seat body may be mounted so that it may be folded forward from an approximately horizontal use position into an approximately vertical, final storage position, as well as into a final lowered position approximately parallel to the use position. In these two final positions, the seat back is folded forward, resting on the seat body.

In one embodiment, one end each of a front and a rear link is attached to the chassis, and the other end is each attached to the seat body. The upper end of the front link is attached to the seat body so that it may be displaced longitudinally, and may be affixed to the seat body by means of a first locking pawl. The lower end of the rear link may be connected with the chassis so that it may be released, and so that it may be affixed in the use position by means of a second locking pawl. The front end of a first connecting lever is connected to the chassis, and its rear end is connected to the rear link.

The rear seat includes a second connecting lever. At least one of the two locking pawls is configured to lock the seat body in one of the final, released storage position or final lowered position and/or additionally to release the seat body from the final, locked storage or lowered position.

The invention includes, in one embodiment, a rear seat apparatus for an automobile having a seat back mounted on a seat body, said rear seat apparatus having a first position wherein said rear, seat is approximately horizontal, a second position wherein said rear seat is adapted to be in an approximately vertical storage position, and at least a third position wherein said rear seat is adapted to be stored in a final, locked lowered position.

A forward link is provided having an upper end connected with an automobile chassis and a lower end connected to said seat body such that said forward link may be displaced longitudinally. Also provided is a rear link having a lower end releasably disposed to said chassis and an upper end connected to said seat body.

A first locking pawl is also provided. Said first locking pawl connecting said forward link to said seat body when in said second position. Also included is a second locking pawl, said second locking pawl releasably connecting said lower end of said rear link to said automobile chassis when in said second position. A first connecting lever having a front end and a rear end connected to said rear link and a second connecting lever respectively, is provided, wherein at least one of said locking pawls is used to lock said rear seat apparatus in said second position, said third position, or to release said rear seat apparatus from the final, locked storage or lowered position.

One advantage to the embodiment disclosed is that two locking latches also prevent the locking latches not required to attain the final position from being released in this position.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
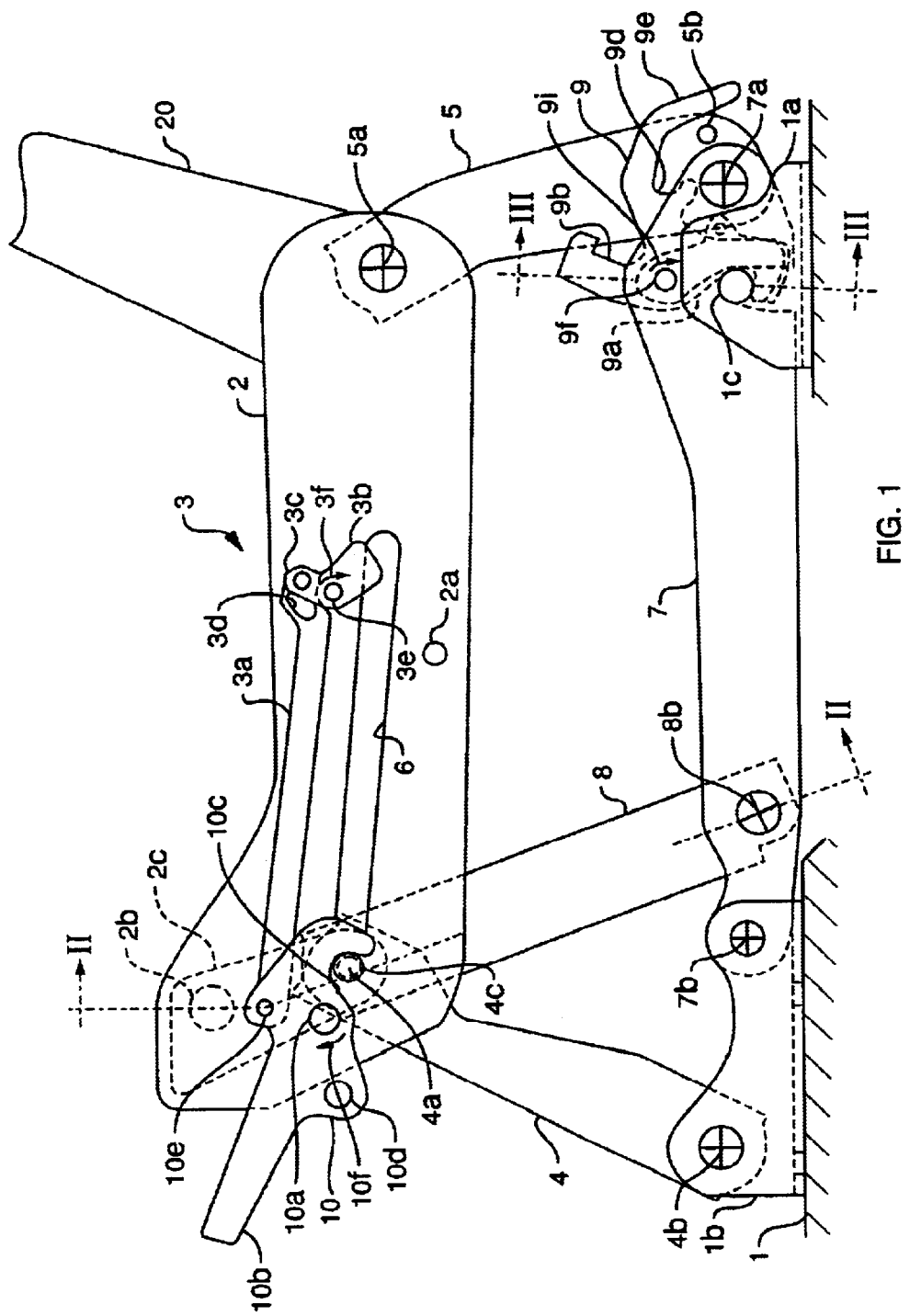
FIG. 1 is a schematic lateral view of a rear seat in use position.

The illustrations show merely the seat body of an automobile seat with its mounting structure, to which a seat back 20 is mounted using a known folding or tilt adjustment mechanism so that it may pivot. The seat body 2 may be folded forward from the use position shown in FIG. 1 either into a vertical storage position, or lowered into a lowered position parallel to the use position. In either the storage position or the lowered position, the seat back 20 is folded down so that its forward surface rests on the upper surface of the seat body 2.

The seat body 2 is supported by means of a pair of forward links 4 and rear links 5 on the floor of a chassis 1, each of which is only partially visible in the illustrations. The forward link 4 is mounted on a swivel fixed pivot bracket 1b attached to the chassis 1 so that it may pivot about a lower pivot point 4b. At an upper pivot point 4a, the link 4 includes a stop stud 4c with which the upper end of the link 4 is guided so that it may be displaced longitudinally within a longitudinal guide mounted on the seat body 2. In the use position of the seat body 2 shown in FIG. 1, the stop stud 4c is overlapped by a ratchet jaw 10c of a first locking pawl 10 that is mounted on a pivot axis 10a on the seat back 2 so that it may pivot. The locking pawl 10 is pivoted by means of an actuation lever 10b to release the stop stud 4c in a counter-clockwise direction. A projection 10d is provided at the locking pawl 10 that limits the pivoting motion. The projection 10d is positioned either on the front edge of the seat body 2 or the front edge of the link 4. The locking pawl 10 is tensioned by a spring in the locking direction that is indicated by an arrow 10f.

Also, a connecting rod 3a of a connecting linkage 3 is also connected to the locking pawl 10 on an axis 10e that extends approximately parallel to the longitudinal guide 6 so that it may pivot. The connecting rod 3a is connected with a blocking element 3b mounted on a pivot axis 3e on the seat body so that it may pivot by means of a gudgeon connection consisting of a gudgeon slot 3d and a gudgeon 3c. The blocking element 3b partially covers the longitudinal guide at its rear end.

The rear link 5 is mounted on an upper link point 5a at the rear of the seat body 2 so that it may pivot. Its lower end is connected by means of an articulated link with a first connecting lever 7 at a rear linkage point. A second locking pawl 9 is mounted on the first connecting lever 7 so that it may pivot about a pivot axis 9f. The first connecting lever 7 surrounds a stud 1c with a recess 7c when the rear seat is located in its use position. The stud 1c is overlapped in the recess 7c by a first ratchet jaw. The stud 1c is held by a swivel fixed pivot bracket 1b attached to the chassis.

In order to release the rear end of the connecting lever 7 from the chassis 1, the second locking pawl 9 is pivoted about the pivot axis 9f by means of an actuation lever 9e against the force of a spring acting along the locking direction 9i. The locking pawl 9 includes an additional ratchet jaw 9b on the side of the pivot axis 9f diametrically opposite ratchet jaw 9a. This additional ratchet jaw 9b interacts with a stop stud 2a attached to the seat body. A recess 9d is provided on the locking pawl 9 and adjacent to the actuation lever that interacts with a projection 5b on the rear link 5.

An additional pawl 9g is mounted on the locking pawl 9 so that it may pivot about the pivot axis 9f. The ratchet jaw 9c of this pawl 9 partially overlaps the ratchet jaw 9a. The additional pawl 9g is tensioned in the locking direction 9i with respect to the connecting lever 7 by an additional spring.

The ratchet jaw 9a surrounds the stud 1c in such a manner that, during loading (for example a crash), no forces act on the locking pawl 9 in the release direction. In order for the ratchet jaw 9a to be pivoted above the stud 1c, it must be positioned with free play with respect to it under normal conditions. This free play might lead to rattling of the seat locking mechanism. The additional ratchet jaw 9c surrounds the stud 1c with a wedge-shaped contact surface and thus compensates for any free play. The ratchet jaw 9a also provides added safety during a crash.

Figure 2:
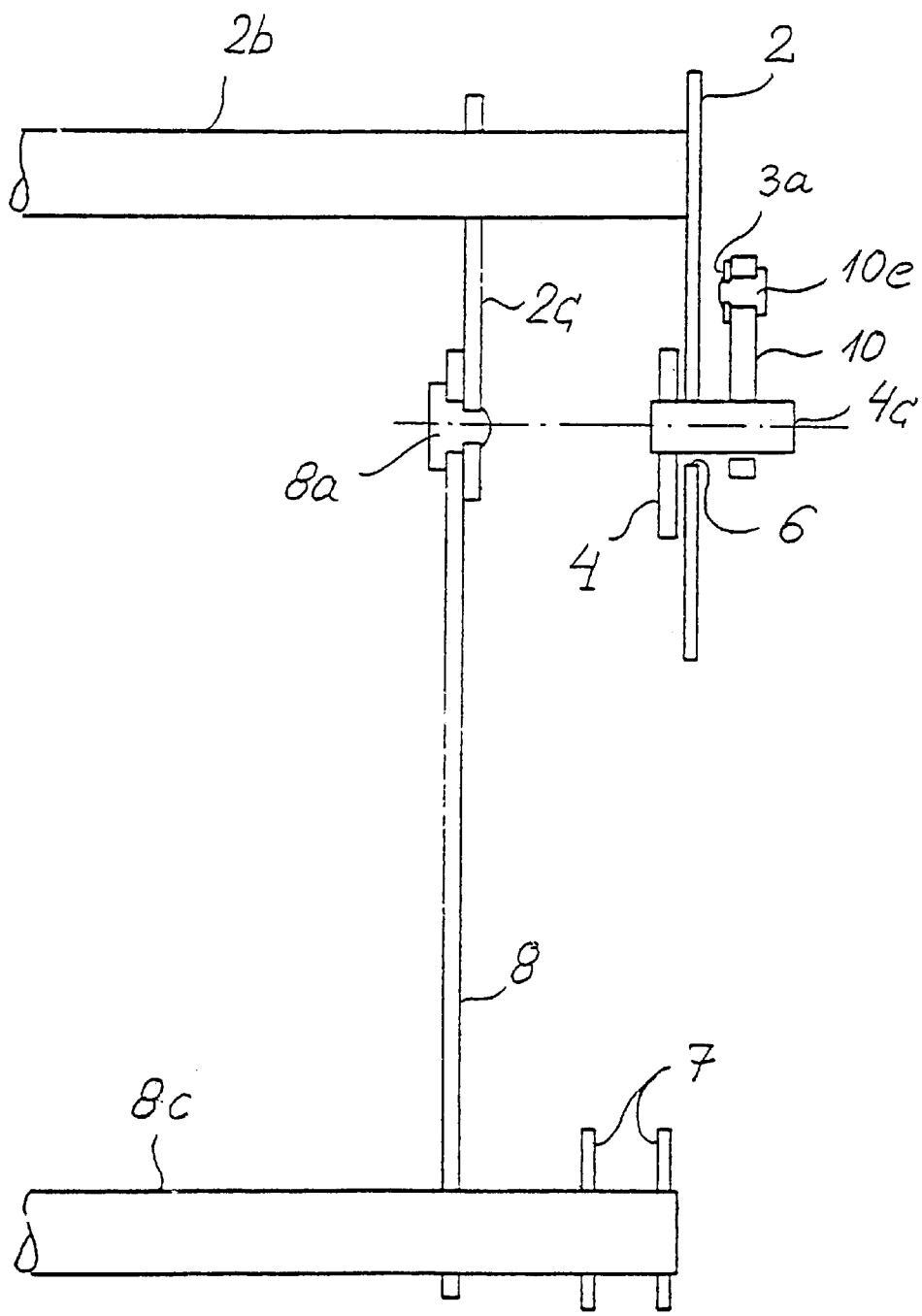
FIG. 2 is a cross-section along projection II—III in FIG. 1.
Figure 3:
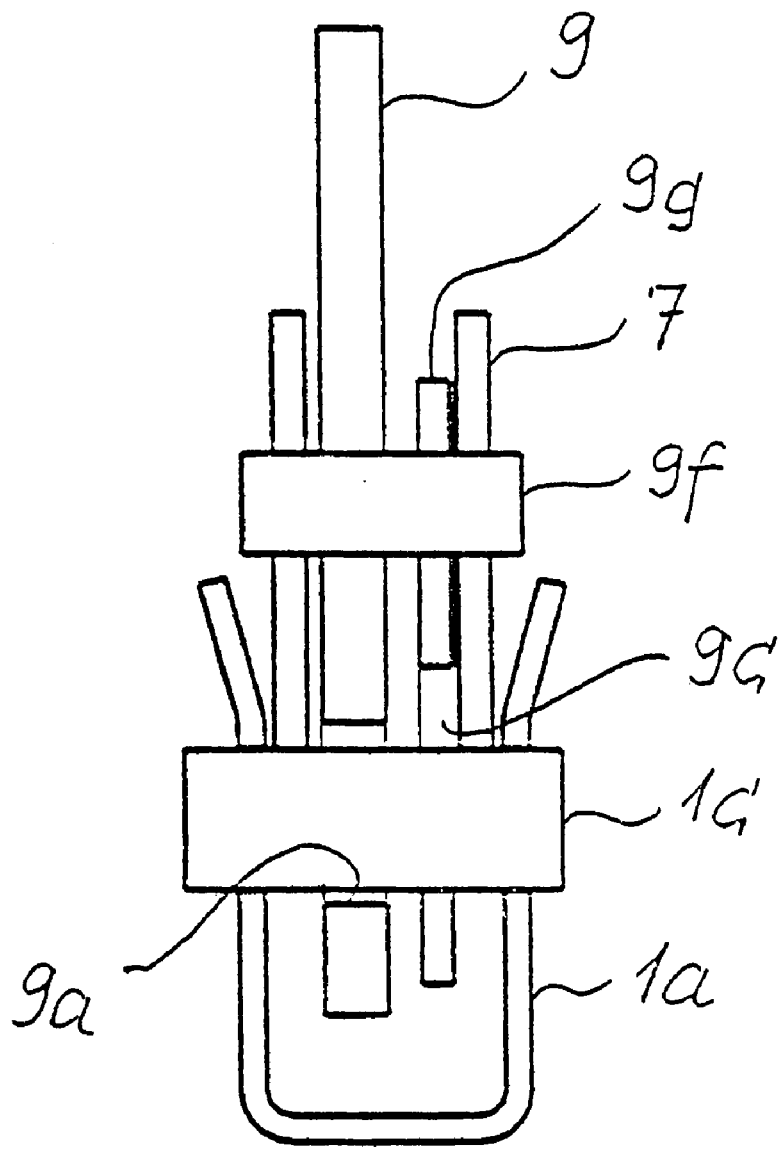
FIG. 3 is a cross-section along projection III—III in FIG. 1.

The front end of the connecting lever 7 is mounted on the swivel fixed pivot bracket 1b so that it may pivot. The forward linkage point 7b of the connecting lever 7 has a small horizontal separation from the link point 4b of the link 4. A second connecting lever 8 is mounted on the first connecting lever 7 between the forward linkage point 7b and the rearward linkage point 7a. The connecting lever 8 pivots about a lower linkage point 8b by means of a rotatable linkage shaft mounted within the connecting lever 7. The upper end of the connecting lever 8 is connected with a shackle 2c attached to the seat body 2 so that it may pivot about an upper linkage point 8a. The shackle 2c is mounted on a forward, tubular crosspiece 2b of the seat body 2. As shown in FIG. 2, the linkage point 8a is aligned with the axis of the rest stud 4 when in the use position.

Figure 4:
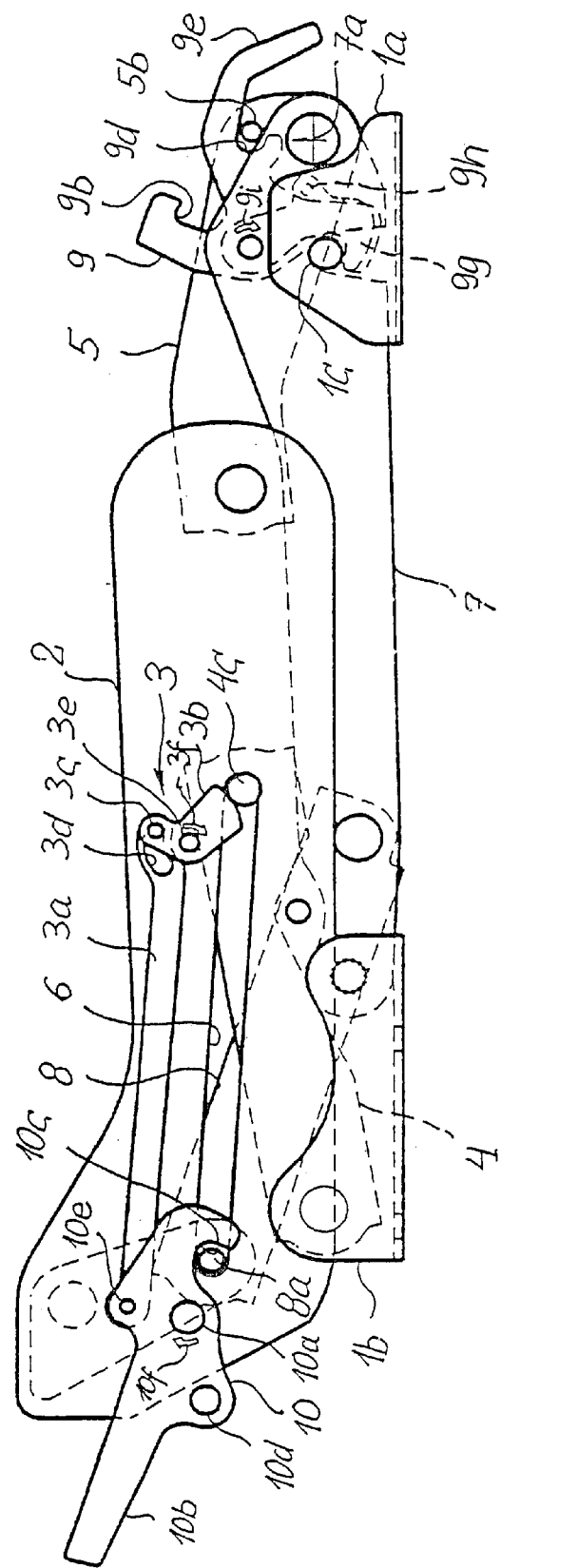
FIG. 4 is a lateral view of the rear seat in FIG. 1 in lowered final position.
Figure 5:
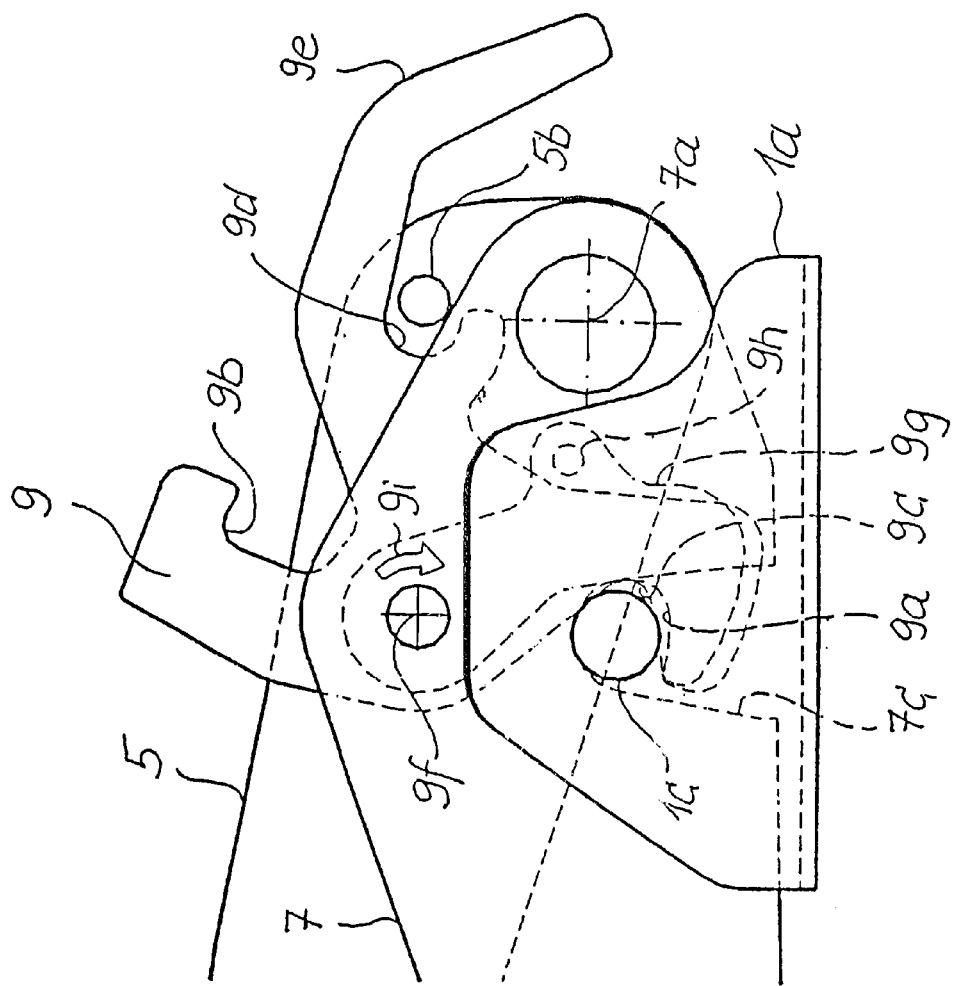
FIG. 5 is an enlarged section of the rearmost link point of the ear seat per FIG. 4.

FIG. 4 shows the seat body 2 together with the seat back folded forward (not shown) in order to increase cargo space such that the seat body 2 is lowered to the point that a flat surface is formed with the adjacent rear seat or with the adjacent cargo room floor. The locking pawl 10 is pivoted in the release direction for this purpose. The upper end of the link 4 is displaced rearward with the stop stud 4c in the longitudinal guide. Simultaneously, the second connecting lever 8 and the rear link 5 pivot counter-clockwise about the lower linkage points 8b and 7a. As shown in FIG. 5, the projection 5b along with the link 5 pivots about the linkage point 7a, and moves into the recess 9d. The locking pawl 9 may therefore no longer pivot.

Because of its displacement rearward, the stop stud 4c forces the blocking element 3b away from the area of the longitudinal guide rail 6, whereby the gudgeon 3c moves in the slot 3d. After the stop stud 4c has passed the blocking element 3b, it is pivoted back into its initial position by the spring labeled with the arrow 3f. Thus, the forward link 4 is blocked in its position with respect to the seat body 2, and the seat body 2 cannot be raised unintentionally. Only when the locking pawl 10 is again actuated is the blocking element 3b removed from the guide path of the stop stud 4c, so that the stepped switching mechanism 2 may return to the use position.

In order to enlarge the access opening to a rear seat row, the seat back is folded onto the seat body 2. The locking pawl 9 is pivoted into its release position by means of the actuation lever 9e, thus releasing the locking pawl 9 from the stop stud 1c. In so doing, the actuation lever 9e brings the projection 9h positioned on the pawl 9g with it, so that the projection 9h also releases the stop stud 1c. The locking pawl 10 remains engaged with the locking stud 4c so that the upper link point 4a cannot be displaced with respect to the seat body 2. The seat body 2 may now be pivoted about the link point 4a into an upright position. The link 4 and the connecting lever 7 thereby pivot about the link points 4b and 7b attached to the chassis. The seat body 2 is thus additionally displaced forward.

Figure 6:
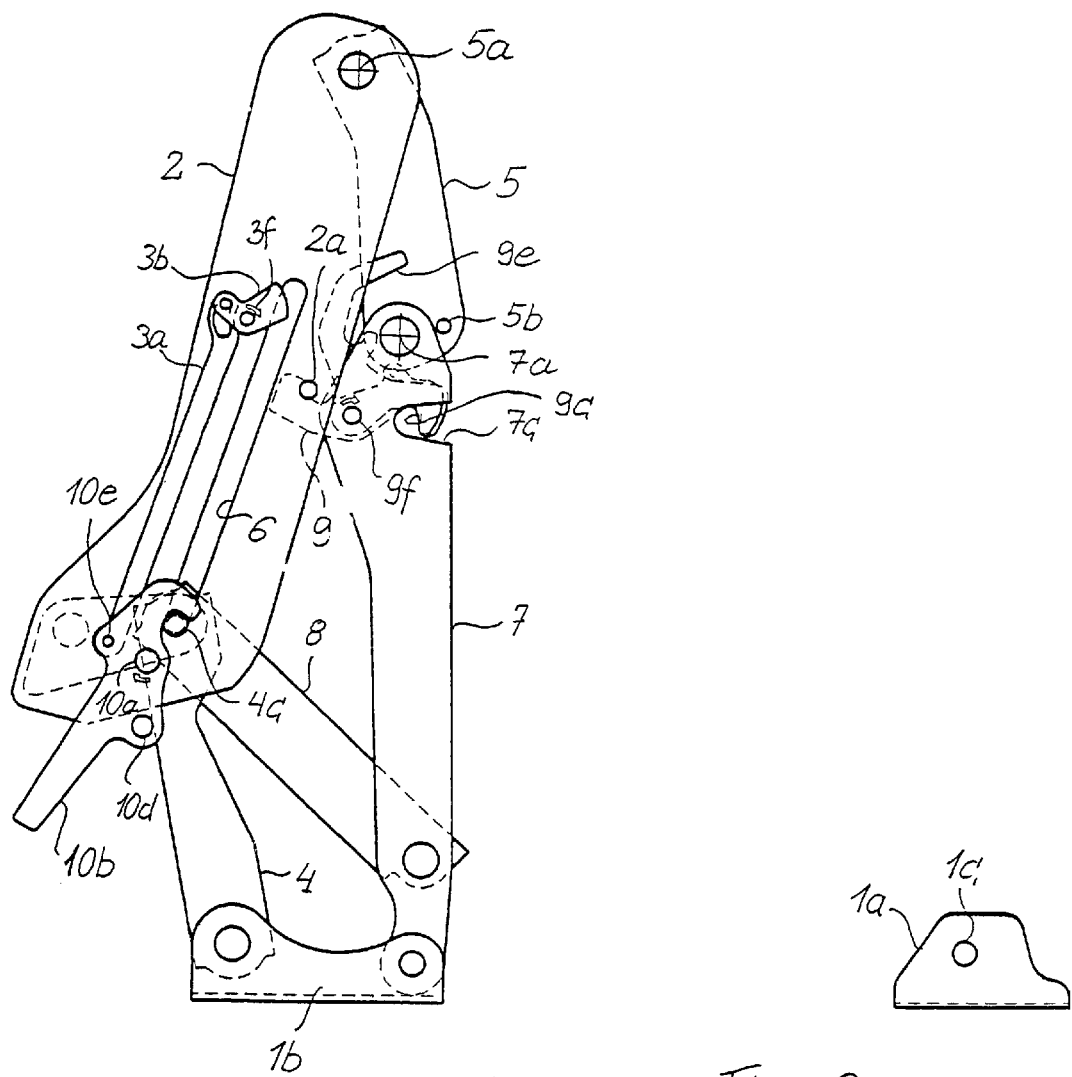
FIG. 6 is a lateral view of the rear seat in FIG. 1 with the seat body folded forward into a storage position.
Figure 7:
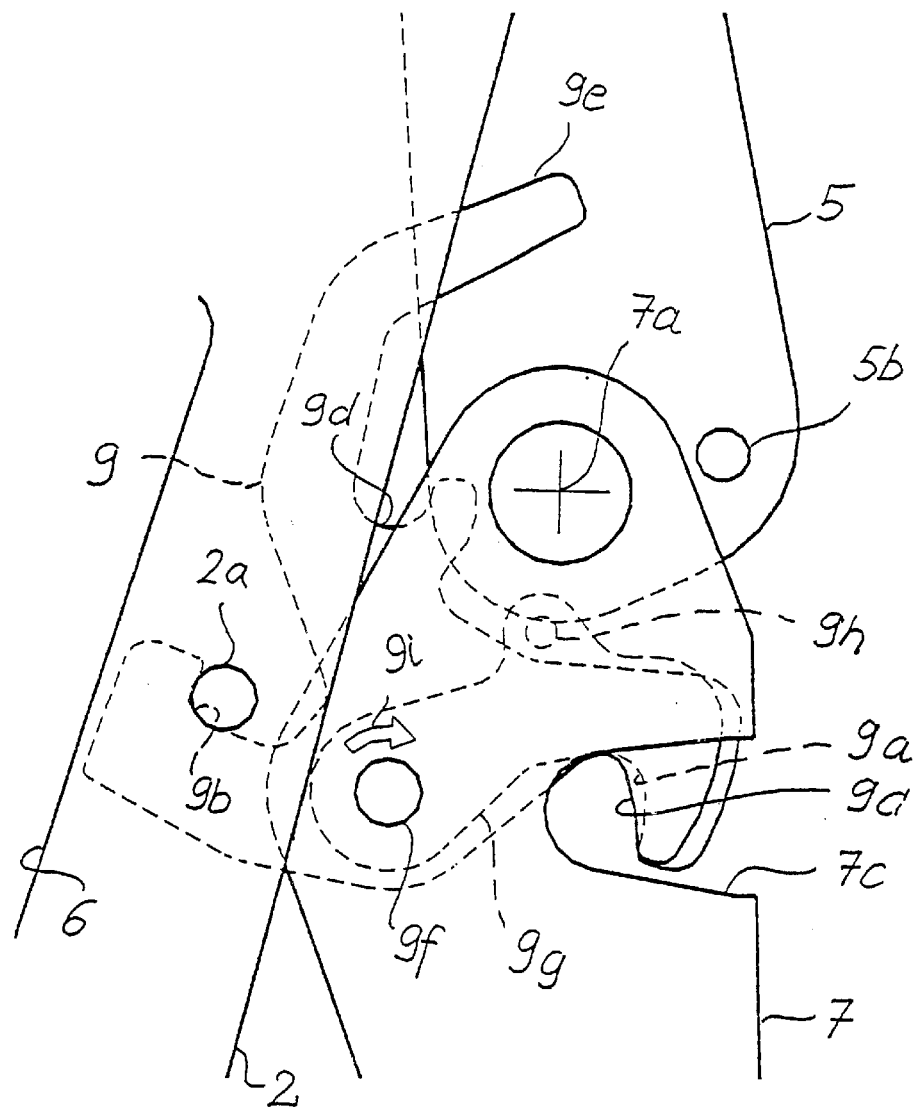
FIG. 7 is an enlarged section of the rearmost link point per FIG. 6.

As shown in FIGS. 6 and 7, the connecting lever 7 almost becomes an extension of the rear link 5 and do not extend into the access opening. Before the seat body 2 is positioned in the storage position, the second locking pawl 9 strikes against the stop stud 2a, and the second ratchet jaw 9b is pressed against it by the spring. Thus, the seat body 2 and the connecting lever 7 are engaged with each other. The seat body 2 may thus be returned to the use position only if the second locking pawl 9 pivots in the release direction, so that the ratchet jaw 9b releases the stop stud 2a.

When the seat body 2 is folded forward into the storage position, the first locking pawl 10 is also pivoted with it about the link point 4a. The projection 10 is thus positioned against the front edge of the link 4. The locking pawl 10 can no longer be pivoted in the release direction.

When the seat body 2 returns to its use position, both the ratchet jaw 9a of the locking pawl 9 and the additional ratchet jaw 9c of the pawl slide over the stud 1c. The seat body 2 is securely connected, without free play, to the chassis 1 by means of the two ratchet jaws 9a and 9c. Both locking pawls 9 and 10 may now be optionally actuated.

Modifications and substitutions by one of ordinary skill in the art are considered to be within the scope of the present invention which is not to be limited except by the claims which follow.

What is claimed is:

1. A rear seat apparatus for an automobile having a seat back mounted on a seat body, said rear seat apparatus having a first position wherein said rear seat apparatus is approximately horizontal, a second position wherein said rear seat apparatus is adapted to be in an approximately vertical storage position, and at least a third position wherein said rear seat apparatus is adapted to be stored in a final, locked lowered position, said rear seat apparatus comprising:

a forward link having an upper end connected with a vehicle chassis and a lower end connected to said seat body such that said forward link may be displaced longitudinally;

a rear link having a lower end releasably disposed to said chassis and an upper end connected to said seat body;

a first locking pawl, said first locking pawl connecting said forward link to said seat body when in said second position;

a second locking pawl, said second locking pawl releasably connecting said lower end of said rear link to said automobile chassis when in said second position;

a first connecting lever having a front end connected to said rear link and a rear end; and a second connecting lever having a first end connected to said first connecting lever between said first and second end of said first connecting lever, and a second end connected to said seat body, wherein at least one of said first and said second locking pawls locks said rear seat apparatus in and releases said rear seat apparatus from said first, said second or said third positions.

2. The rear seat apparatus as claimed in claim 1, wherein at least one of said locking pawls interacts with at least one stop stud.

3. The rear seat apparatus as claimed in claim 1, wherein at least one of said locking pawls is tensioned against a release direction by a spring.

4. The rear seat apparatus as in claim 2, wherein at least one of said locking pawls is tensioned against a release direction by a spring.

5. The rear seat apparatus as claimed in claim 2, wherein said stop stud is a stud guiding said forward link on said seat body longitudinally in a longitudinal guide that is held in a locking position corresponding to said third position by way of a connecting linkage connected with said first locking pawl.

6. The rear seat apparatus as claimed in claim 5, wherein said connecting linkage includes a linked connecting rod pivotable on said first locking pawl, and a pivotable blocking element mounted on an axis parallel to a pivot axis of said first locking pawl.

7. The rear seat apparatus as claimed in claim 6, wherein said blocking element is pivotably connected to said connecting rod.

8. The rear seat apparatus as claimed in claim 7, wherein said blocking element is pivotably connected to said connecting rod using a slot-and-gudgeon connection.

9. The rear seat apparatus as claimed in claim 1, wherein when said rear seat apparatus is in said second position, said first locking pawl is blocked so that it may not pivot.

10. The rear seat apparatus as claimed in claim 9, wherein a projection which is disposed on said first locking pawl contacts said forward link in preventing said first locking pawl from pivoting when in said second position.

11. The rear seat apparatus as claimed in claim 2, wherein at least one stop stud is disposed on said seat body.

12. The rear seat apparatus as claimed in claim 11, wherein said second locking pawl includes at least two ratchet jaws, said ratchet jaws adapted to interact with a stud affixed to the chassis and with said stop stud disposed on said seat body.

13. The rear seat apparatus as claimed in claim 12, further comprising at least a third pivotable ratchet jaw that pivots about a same pivot axis as said first and said second pivotable ratchet jaws.

14. The rear seat apparatus as claimed in claim 13, wherein said third ratchet jaw is tensioned by a spring.

15. The rear seat apparatus as claimed in claim 11, wherein when said rear seat apparatus is in said third position said second locking pawl may not pivot.

16. The rear seat apparatus as claimed in claim 15, wherein a projection disposed on said rear link prevents said second locking pawl from pivoting when said rear seat apparatus is in said third position.

* * * * *